US010396492B2

(12) United States Patent
Krize et al.

(10) Patent No.: US 10,396,492 B2
(45) Date of Patent: *Aug. 27, 2019

(54) ELECTRIC POWER DISTRIBUTION USING MAGNETIC ELECTRICAL CONNECTORS

(71) Applicant: Christmas Northeast, Inc., Trumbull, CT (US)

(72) Inventors: Anthony Krize, Huntersville, NC (US); Matthew Ryder, Attleboro, MA (US); James W. Gibboney, Jr., Suches, GA (US)

(73) Assignee: Christmas Northeast, Inc., Trumbull, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,016

(22) Filed: Jan. 31, 2019

(65) Prior Publication Data
US 2019/0165512 A1 May 30, 2019

Related U.S. Application Data

(63) Continuation-in-part of application No. 16/108,642, filed on Aug. 22, 2018, now Pat. No. 10,236,627, and
(Continued)

(51) Int. Cl.
*H01R 13/62* (2006.01)
*H01R 13/24* (2006.01)
(Continued)

(52) U.S. Cl.
CPC ......... *H01R 13/6205* (2013.01); *H01R 13/04* (2013.01); *H01R 13/24* (2013.01);
(Continued)

(58) Field of Classification Search
CPC .................................................. H01R 13/6205
See application file for complete search history.

(56) References Cited

U.S. PATENT DOCUMENTS 223,898 A    1/1880  Edison
317,613 A    5/1885  Edison
(Continued)

FOREIGN PATENT DOCUMENTS

EP        0231428 B1    11/1991
WO    2005020388 A1     3/2005

*Primary Examiner* — Tho D Ta
(74) *Attorney, Agent, or Firm* — Nexsen Pruet, LLC; Michael A. Mann

(57) ABSTRACT

The present magnetic electrical connectors use magnets to press electrical terminals together, when the magnetic electrical connectors are correctly oriented with respect to each other. A magnetic electrical connector is identical other magnetic electrical connectors so there are fewer parts used for manufacturing and the assembly of the electrical connectors is simplified. The present electrical connectors improve electrical connection in applications where physical connection may be difficult to achieve because of limited physical access or because of low light conditions. When inserted into the ends of a conduit, the present magnetic electrical connectors transfer electricity through conduits that may have a different primary purpose. Conduits may be, for example, scaffolding or temporary barriers, velvet rope, or trim for modular furniture. In the case of scaffolding and a temporary barriers, magnetic electrical connectors can transfer electricity for lighting, power tools, and communications.

14 Claims, 19 Drawing Sheets

Related U.S. Application Data a continuation-in-part of application No. 15/437,106, filed on Feb. 20, 2017, now Pat. No. 9,899,813.

(51) Int. Cl.
*H01R 13/04* (2006.01)
*H01R 13/625* (2006.01)
*H02G 3/20* (2006.01)
*H01R 13/64* (2006.01)
*H01R 33/18* (2006.01)

(52) U.S. Cl.
CPC ............ *H01R 13/625* (2013.01); *H02G 3/20* (2013.01); *H01R 13/64* (2013.01); *H01R 33/18* (2013.01)

(56) References Cited

U.S. PATENT DOCUMENTS

| | | | |
|---|---|---|---|
| 438,310 A | 10/1890 | Edison | |
| 2,573,920 A | 11/1951 | McLeod | |
| 3,127,492 A | 3/1964 | Date | |
| 3,706,882 A | 12/1972 | Eby | |
| 3,871,734 A | 3/1975 | Murtland | |
| 5,484,300 A | 1/1996 | Whitney et al. | |
| 5,723,820 A | 3/1998 | Whitney et al. | |
| 6,022,231 A | 2/2000 | Williams et al. | |
| 6,575,764 B1 | 6/2003 | Reipur | |
| 6,677,689 B2 | 1/2004 | Marihugh et al. | |
| 7,833,027 B2 | 11/2010 | Jong | |
| 8,272,876 B2 | 9/2012 | Schultz | |
| 8,348,678 B2 * | 1/2013 | Hardisty | H01R 13/6205 439/39 |
| 8,702,594 B2 * | 4/2014 | Edidin | H01R 13/6205 439/38 |
| 8,794,980 B2 | 8/2014 | McCormack | |
| 8,936,472 B1 | 1/2015 | Gibboney, Jr. | |
| 9,287,658 B2 * | 3/2016 | Lewin | H01R 13/523 |
| 9,614,322 B1 * | 4/2017 | Gibboney, Jr. | H01R 13/64 |
| 9,899,813 B1 | 2/2018 | Gibboney, Jr. | |
| 10,014,624 B2 | 7/2018 | Chun | |
| 10,243,299 B1 * | 3/2019 | Krize | H01R 13/6205 |
| 2010/0181841 A1 | 7/2010 | Azancot et al. | |
| 2011/0159706 A1 | 6/2011 | Wu | |
| 2012/0295451 A1 | 11/2012 | Hyun-Jun et al. | |
| 2015/0111403 A1 | 4/2015 | Byrne | |

\* cited by examiner

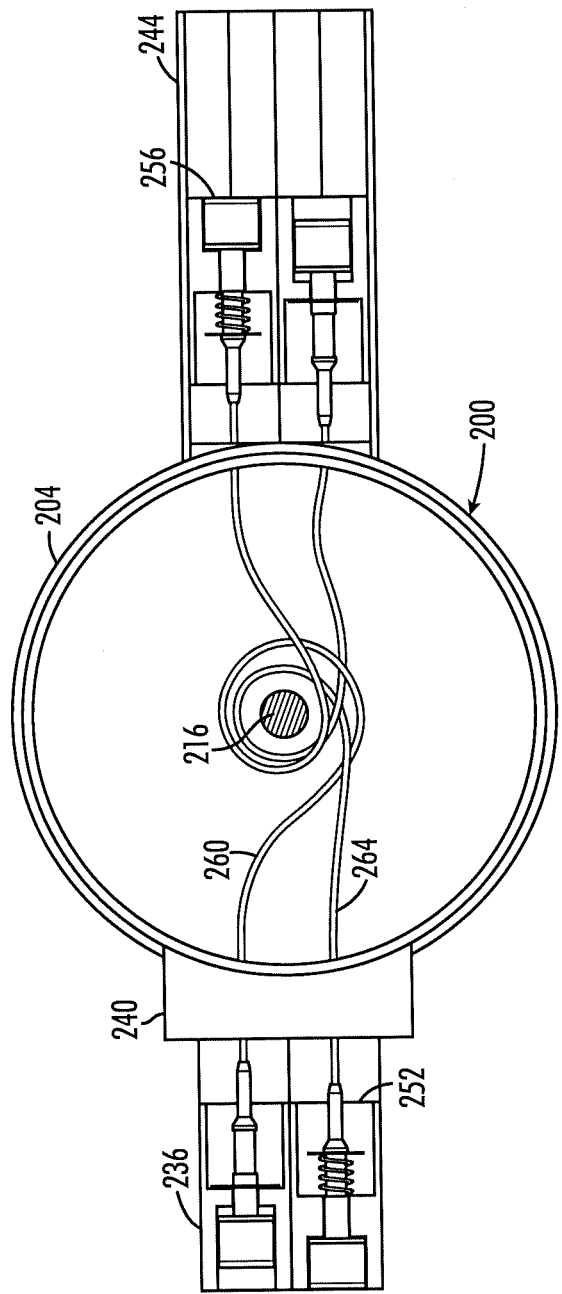

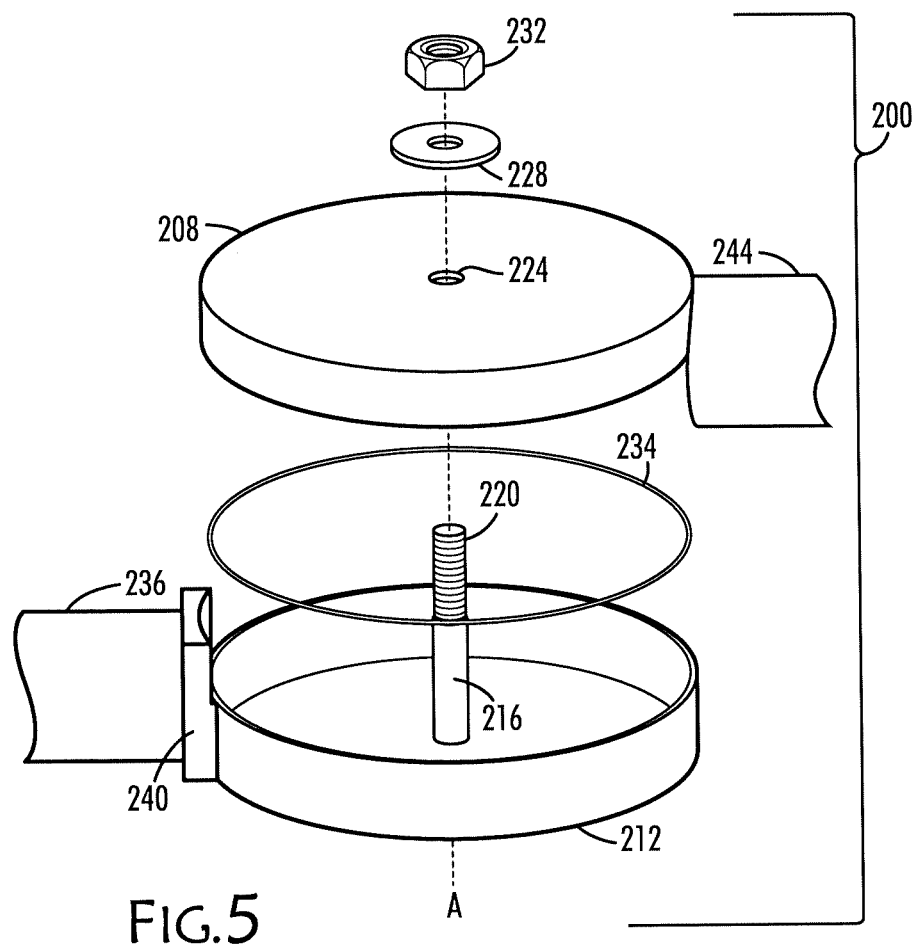
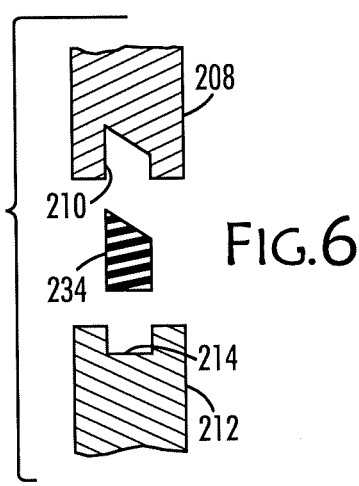

ELECTRIC POWER DISTRIBUTION USING MAGNETIC ELECTRICAL CONNECTORS

TECHNOLOGICAL FIELD

The disclosure relates to electrical connectors for passing electrical current. More particularly, the present disclosure relates to electrical connectors that connect to each other magnetically.

BACKGROUND

Most electrical connectors are joined by mechanical means, typically using a male/female, frictionally-fitting connections, in order for them to pass an electrical current from one connector to the other. Other connectors may use magnetism to establish electrical connection. For example, a magnetic attraction between two electrical connectors may be used to join the two connectors instead of a mechanical means. U.S. Pat. Nos. 9,614,322 and 8,936,472, which disclose magnetic electrical connectors use magnetic repulsion to orient themselves and magnetic attraction to draw the two electrical terminals together. These patents, commonly owned by the present applicant, are incorporated herein in their entirety by reference. Magnetic connectors are useful in circumstances where two electrical connectors cannot be easily joined by manual effort.

One example of these circumstances is in artificial holiday trees. Electrical current is passed by conductors via tubes or hollow poles that simulate the trunk of an evergreen tree. Existing pole construction for artificial holiday trees uses an indentation and protrusion interlock system to serve as a key and keyway arrangement for correctly orienting the connectors. Because the friction-fitted connecting poles tend to come apart when the tree is lifted and to get stuck together and thereby complicate tree disassembly, safety issues may result.

A set of connectors that is reliable and that readily connect in the proper polarity that do not have to be physically oriented and physically joined, yet is inexpensive to manufacture in quantity, more durable, more reliable, and safer, would be advantageous.

SUMMARY

The present electrical connectors use magnets to close electrical terminals, and additionally, to confirm correct orientation of electrical terminals properly with respect to each other. The electrical connectors are identical so there are fewer parts used for manufacturing and the assembly of the electrical connectors is simplified. The present electrical connectors may be used to improve electrical connection in applications where electrical connectors may be difficult to join because of limited physical access or because of low light conditions.

When inserted into the ends of a conduit, the present electrical connectors add the feature of electricity transfer to conduits that may have a different primary purpose. Conduits may be, for example, scaffolding or temporary barriers. Scaffolding and a temporary barrier would then be also able to transfer electricity for lighting, power tools, communications, and other purposes.

A feature of the present disclosure is an electrical power distribution system that has a first conduit having a first end and a second end; a second conduit having a third end and a fourth end, where the second end of the first conduit is connected to the third end of the second conduit. In addition, a first magnetic electrical connector is in the second end of the first conduit, and wherein the first magnetic electrical connector has a first terminal, a second terminal, a first magnet, and a second magnet. A second magnetic electrical connector are in the third end of the second conduit, wherein the second magnetic electrical connector has a third terminal, a fourth terminal, a third magnet, and a fourth magnet. A source of electrical current is connected across the first terminal and the second terminal of the first magnetic electrical connector, and an electrical load is connected across the third terminal and the fourth terminal of the second magnetic electrical connector. Accordingly, the first terminal and the third terminal are pressed together by magnetic attraction between the first magnet and the third magnet, and the second terminal and the fourth terminal are pressed together by magnetic attraction between the second magnet and the fourth magnet, wherein an electrical current can pass from the source of electrical current through the first conduit and the second conduit to the load.

Another aspect of the disclosure is that the second end of the first conduit has a first aperture and a second aperture, and the first end of the second conduit has a third aperture and a fourth aperture. The first aperture faces the third aperture and the second aperture faces the fourth aperture. When the first terminal is positioned at the first aperture, the second terminal is positioned at the second aperture, the third terminal is positioned at the third aperture, and the fourth terminal is positioned at the fourth aperture, the first terminal will touch the third terminal as the first magnet presses the first terminal toward the third terminal and the third magnet will press the third terminal toward the first terminal, and the second terminal will touch the fourth terminal when the second magnet presses the second terminal toward the fourth terminal and the fourth magnet pressed the fourth terminal toward the second terminal.

Another aspect of the electrical distribution system is that the first magnet is held near the first aperture by a first set of keepers, the second magnet is held near the second aperture by a second set of keepers; the third magnet is held near the third aperture by a third set of keepers; and a fourth magnet is held near the fourth aperture by a fourth set of keepers.

An aspect of the electrical distribution system is that the first magnetic electrical connector may include a first pin conductor and a second pin conductor, and the second magnetic electrical connector may include a third pin conductor and a fourth pin conductor. The first pin conductor may be in electrical contact with the third pin conductor and the second pin conductor may be in electrical connection with the fourth pin conductor. The pairs of pins may deliver direct current, alternating current, or digital data.

Another aspect of the disclosure is that the electrical distribution system conduits may be incorporated into traffic barriers, scaffolding, velvet rope barriers, or decorative trim on modular office furniture.

An aspect of the disclosure is that the conduits of the electrical distribution system may be friction fitted together threaded together. joined together by a coupler, or joined with bayonet fittings.

Other features and their advantages will be evident to those skilled in the art of electrical distribution from a careful reading of the following detailed description, accompanied by the following drawings.

BRIEF DESCRIPTION OF THE DRAWINGS

In the figures,

FIG. 4 shows a top cross-sectional view of a pivotable conduit used for changing direction of a series of conduits with magnetic electrical connectors in each end, according to an aspect of the disclosure;

FIG. 5 shows an exploded, side perspective view of the pivotable conduit of FIG. 4, according to an aspect of the disclosure;

FIG. 6 shows an exploded cross-sectional detail of the upper and lower covers and the gasket of the pivotable conduit of FIG. 4, according to an aspect of the disclosure;

DETAILED DESCRIPTION

Figure 1:
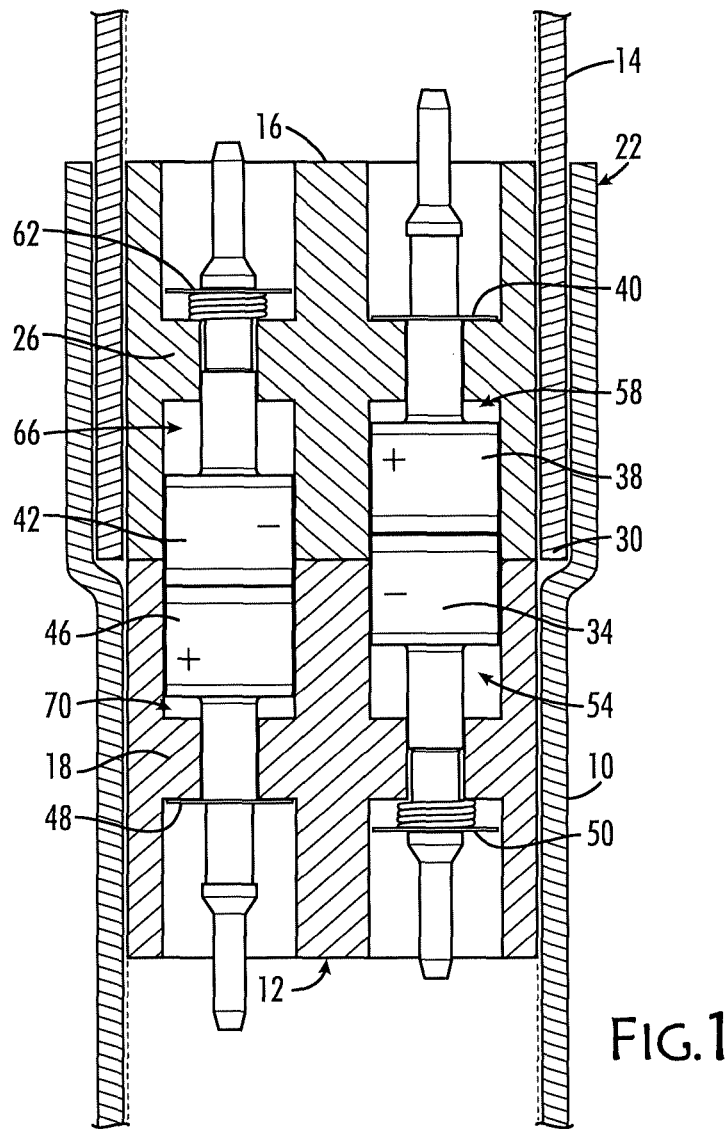
FIG. 1 is side cross-sectional view of a pair of magnetic electrical connectors in electrical connection, according to an aspect of the disclosure.

The present disclosure describes a magnetic electrical connector. It also describes a pair of such connectors in electrical connection with each other to serve as an extension cord, either connected facing each other or facing away from each other with an electrical conductor connecting them. That electrical conductor with its two magnetic electrical connectors can be carried inside a conduit to enable electrical power to be delivered by the conduit for use in temporary barriers with lighting, for example where the conduit has a primary function of being a temporary barrier.

The present magnetic electrical connector is neither a "male" connector nor a "female" connector, unlike an Edison "plug" and "socket," although the shapes of the conduit and the housing of the magnetic electrical connector may be varied from that shown in the present drawings to adapt to the environment of use. Two such magnetic electrical connectors can be joined together to pass electricity from one connector to another or they can be used on ends of an extension cord.

Therefore, for example, in an extension cord with a magnetic electrical connector according to the present disclosure on each end, either end of the extension cord can be connected to a wall outlet, provided that the wall outlet mates with the present magnetic electrical connector. The remaining end of the extension cord can be connected to, for example, an appliance having the same type of magnetic electrical connector.

An extension cord as disclosed herein can be placed inside a conduit with one of the magnetic electrical connectors flush-mounted to one end of the conduit and the other electrical connector recessed in the opposing end of the conduit so that a portion of the conduit extends past the magnetic electrical connector. That end of the conduit can receive the end of a second such conduit that has its magnetic electrical connector flush-mounted so the two mating, magnetic electrical connectors meet inside the conduits. Conduits are joined to other such conduits to but increase the total length of conduits and also to connect extension cords using the present magnetic electrical connectors together in a electrically continuous conductive chain. Not only is the conduit available for a structural purpose (a barrier, a railing, or a trim piece, for example) and so, too, is the electricity carried by a series of magnetic electrical connectors inside the barrier.

The term conduit is used herein to refer to any structural member that has a passage formed in it. The passage is dimensioned and formed to accommodate magnetic electrical connectors and their electrical conductors and of the conduit may have a variety of configuration including those for a different purpose than conducting electricity from one point to another.

In the present disclosure, magnetic electrical connectors are the to connect when they are in a position relative with respect to each other with their contacts touching so as to be able to transfer electricity from the magnetic electrical connector contacts of one magnetic electrical connector to the magnetic electrical connector contacts of the next magnetic electrical connector.

Referring now to FIG. 1, there is illustrated in perspective two magnetic electrical connectors: a first magnetic electrical connector 18, and a second magnetic electrical connector 26. First magnetic electrical connector 18 and has a housing 12 recessed inside conduit 10, leaving an expanded portion 22 of first conduit 10 to receive the end of a second conduit 14 that holds a second magnetic electrical connector 26 with a housing 16.

First magnetic electrical connector 18 has a first terminal 34 and a second terminal 42; likewise, second magnetic electrical connector 26 has a third terminal 38 and a fourth terminal 46. First terminal 34 of first magnetic electrical connector 18 is shown opposite to first terminal third of second magnetic electrical connector 26; and second terminal 42 of second magnetic electrical connector 26 is shown opposite to a fourth terminal 46 of first magnetic electrical connector 18.

First terminal 34 of first magnetic electrical connector 18 is movable in a channel 54. Second terminal 42 of second magnetic electrical connector 26 is movable in a second channel 66. The movements of first terminal 34 and second terminal 42 are limited by washers 50, 62, respectively.

Second terminal 38 of second magnetic electrical connector 26 is fixed in a first channel 58, and fourth terminal 46 of second magnetic electrical connector 18 are fixed in a channel 70 by washers 40, 48, respectively.

When first magnetic electrical connector 18 and second magnetic electrical connector 26 are brought into engagement in the correct orientation for electricity to pass from one to the other, first terminal 34 moves partially along first channel 58 to connect magnetically and electrically with third terminal 38 of second magnetic electrical connector 26, and second terminal 42 of second magnetic electrical connector 26 moves partially along second channel 66 of second terminal 42 to make contact with fourth terminal 46 of first magnetic electrical connector 18.

First terminal 34 of first magnetic electrical connector 18 and second terminal 42 of second magnetic electrical connector 26 control whether they enter into electrical contact with third terminal 38 of first magnetic electrical connector 26 and with fourth terminal 46 of second magnetic electrical connector 18, respectively, because they can move in response to magnetic attraction.

Figure 2:
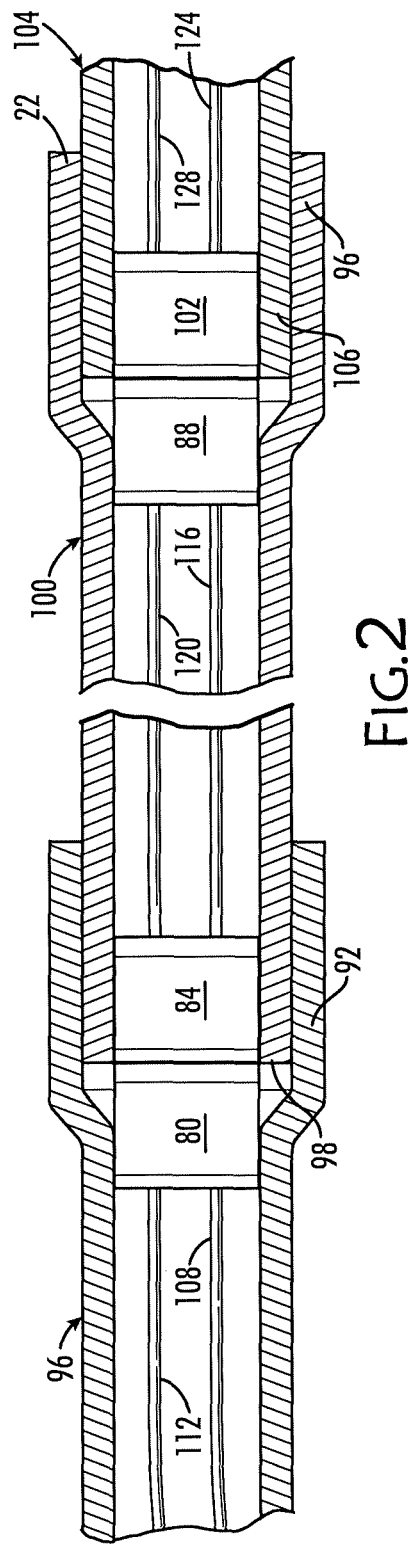
FIG. 2 is a side cross-sectional view of a conduit joined to portions of two other conduits with their magnetic electrical connectors connected to pass electrical current through the conduits, according to an aspect of the disclosure.

FIG. 2 shows a side, cross-sectional view of a first conduit 100 and portions of a second conduit 96 and a third conduit 104 connected to the ends of first conduit 100. A first end 98 of first conduit 100 in received inside an expanded end 92 of second conduit 96. An expanded end 96 of first conduit 100 receives the first end 106 of third conduit 104. First conduit 100, second conduit 96 and third conduit 104 are secured together by friction. Other types of fittings may also be suitable, as will be discussed more fully below.

Inside first conduit 100, at first end 98 is a first magnetic electrical connector 84; and a second magnetic electrical connector 88 is at the second end 96 of first conduit 100. Recessed in the expanded end 92 of second conduit 96, is a third magnetic electrical connector 80 engaging first magnetic electrical connector 84 at first end 98 of first conduit 100. At first end 106 of third conduit 104 is a fourth magnetic electrical connector 102 in engagement with second magnetic electrical connector 88.

First electrical conductor 108 and second electrical conductors 112 lead to third magnetic electrical connector 80 bringing an electrical current from a source (not shown). The electrical current passes from third magnetic electrical connector 80 to first magnetic electrical connector 84 whereupon a third electrical conductor 116 and a fourth electrical conductor 120 and run from there to second magnetic electrical connector 88, which is in electrical connection with fourth magnetic electrical connector 102. From fourth magnetic electrical connector 102, a fifth electrical conductor 124 and a sixth electrical conductor 128, and so forth, continue.

First conduit 100, second conduit 96 and third conduit 104 thus carry first electrical conductor 108 and second electrical conductor 112, third electrical conductor 116 and fourth electrical conductor 120, and fifth electrical conductor 124 and sixth electrical conductor 128, respectively, connected by third magnetic electrical connector 80, first magnetic electrical connector 84, second magnetic electrical connector 88, and fourth magnetic electrical connector 102, respectively, to form an electrical power line enclosed in a sequence of second conduit 96, first conduit 100, and third conduit 104.

Figure 3:
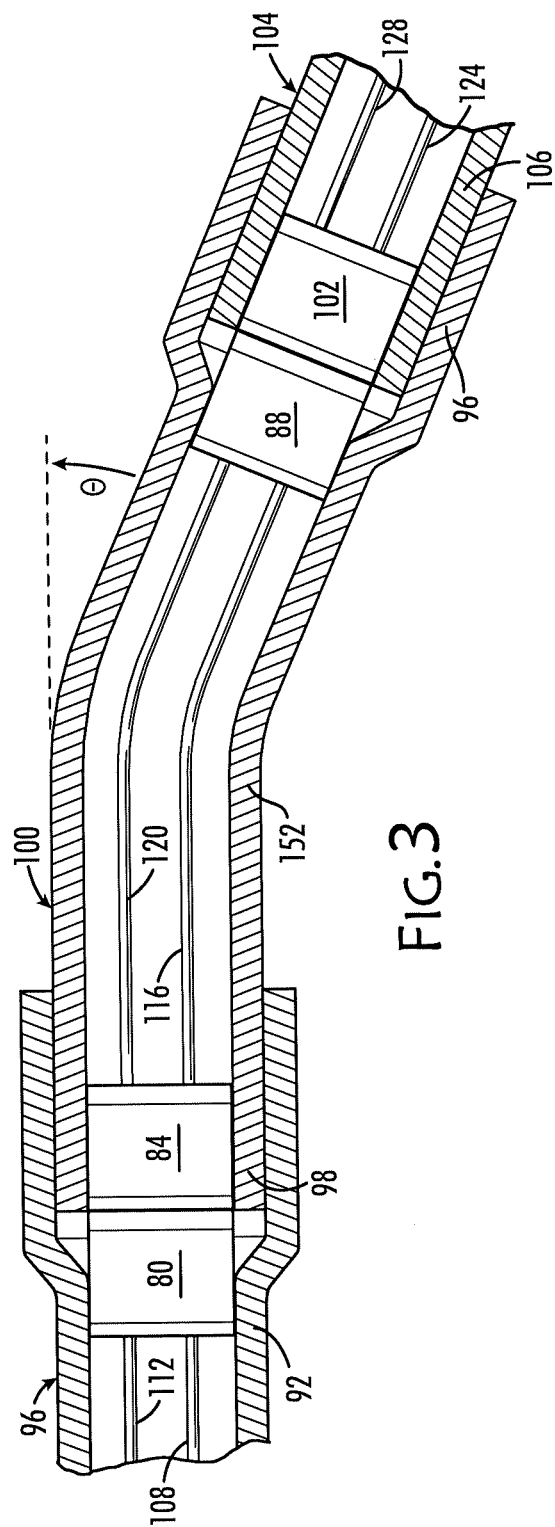
FIG. 3 is a side cross-sectional view of a conduit and portions of two other conduits joined so that their magnetic electrical connectors pass electrical current wherein the middle conduit is curved to change direction of conduits, according to an aspect of the disclosure.

FIG. 3 is the same as FIG. 2 and shows the same conductors and magnetic electrical connectors in conduits except that first conduit 100 is bent at second 96, first conduit 100, second conduit 104, and third conduit 104, respectively, does not necessarily define a straight line and can be bent to change its direction.

Figure 7:
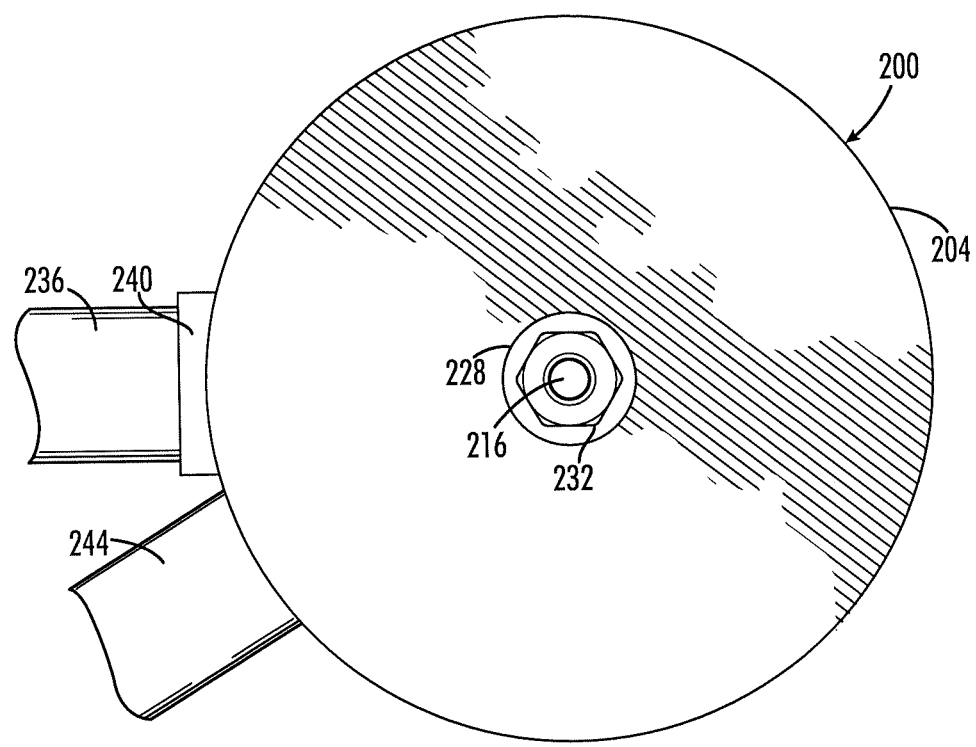
FIG. 7 shows a top view of the pivotable conduit of FIG. 4 pivoted to an extreme angle, according to an aspect of the disclosure.

FIGS. 4, 5, 7 and 7 illustrate an alternate way to change the direction of conduits. A conduit 200 has a first end 236 and an opposing second end 244. A first magnetic electrical connector 252 is flush-mounted at first end 236; a second magnetic electrical connector 256 is recessed in second end 244.

Between first and 236 and second end 244 is conduit 200 having an upper shell 208 and a lower shell 212 (best seen in FIG. 5) with a circular gasket 234 between them. A bolt 220 passes from lower shell 212 thence through a hole 224 in upper shell 208, where it is secured with a washer 228 and a nut 232, as seen in FIG. 7.

FIG. 5 shows an exploded view of upper shell 208 over lower shell 212. FIG. 6 shows an exploded, cross-sectional view of a portion of the walls of upper shell 208 and lower shell 212 wherein an upper groove 210 and lower groove 214, capture gasket 234 therebetween. First end 236 of conduit 200 has a bushing 240 that joins tubular first end 236 to lower shell 212; second end 244 is attached, to upper shell 208 for example, by welding.

As best seen in FIG. 4, first magnetic electrical connector 252 and second mechanical electrical connector 256 are connected electrically by a first conductor 260 and a second electrical conductor 264 that travel from first magnetic electrical connector 252 at first end 236 of conduit 200 to second magnetic electrical connector 56 second end 244. In doing so, they traverse the space inside upper shell 208 and lower shell 212 and pass around bolt 220. First electrical conductor 260 and second electrical conductor 264 are not connected tightly to first magnetic electrical connector 252 and to second magnetic electrical connector 256. Rather, they are connected loosely so that first electrical conductor 260 and second electrical conductor 264 have sufficient slack to remain connected even when upper shell 208 and lower 212 shell are rotated nearly 360 degrees with respect to the other, as illustrated in FIG. 7.

Figure 8:
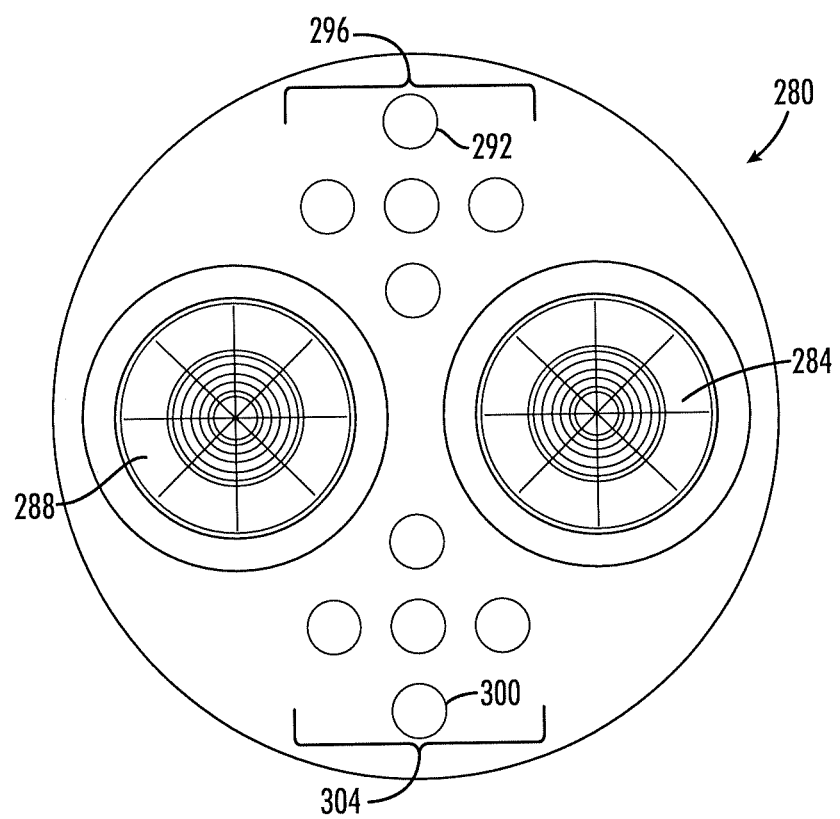
FIG. 8 is an end view of a magnetic electrical connector showing two primary current terminals and two sets of five pin connectors for transmitting signals and data, according to an aspect of the disclosure.
Figure 9:
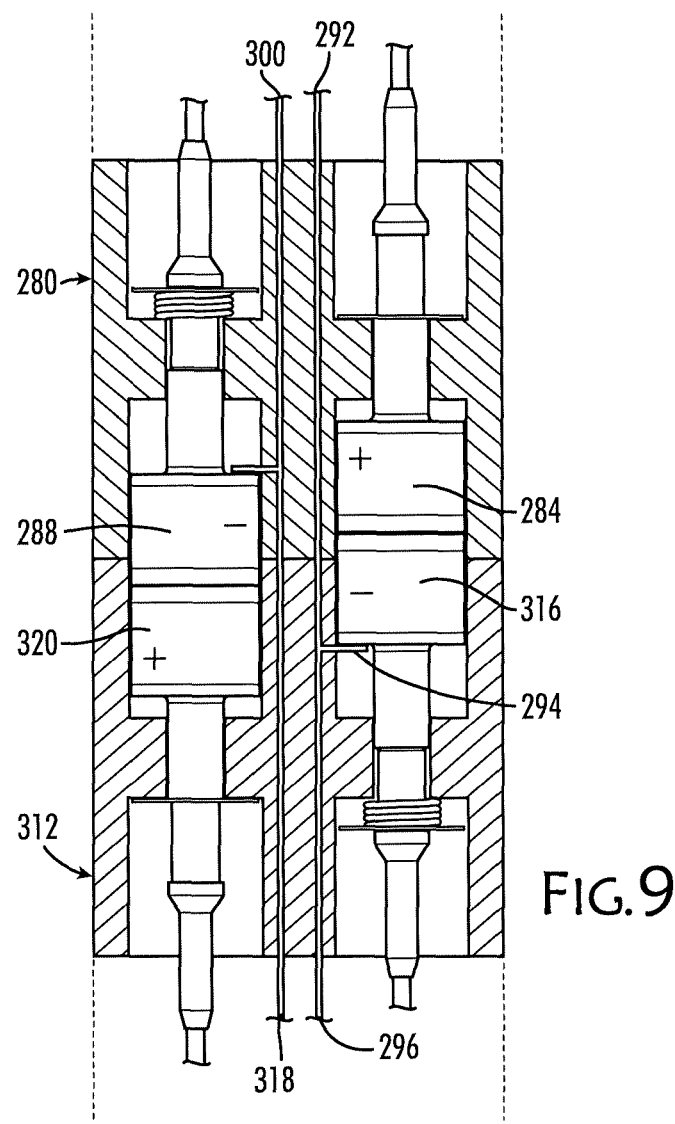
FIG. 9 is a side cross-sectional view of two magnetic electrical connectors of the type shown in the end view of FIG. 8, that include pin connectors for additional electrical transmissions, according to an aspect of the disclosure.

FIGS. 8 and 9 illustrate an end view and a side view of magnetic electrical connectors that may be used for conduct an electrical current and simultaneously for conducting electricity for other purposes such as digital information, battery charging or signals.

FIG. 8 shows the end view of a magnetic electrical connector 280 with two electrical terminals, namely, a first terminal 284 and a second terminal 288. In addition, there is a first set 296 of pin conductors 292 and a second set 304 of pin conductors 300.

FIG. 9 (simplified from FIG. 8 by showing one pin conductor to represent a group of pin conductors per magnetic electrical connector) shows a side, cross-sectional view of magnetic electrical connector 280 toward the top if the figure in contact with a second magnetic electrical connector 312 toward the bottom of the figure. A first pin conductor 292 of first magnetic electrical connector 280 is connected to a third pin conductor 296 of a second magnetic electrical connector 312, and a second pin conductor 300 of first magnetic electrical connector 280 is shown connected to a fourth pin conductor 318 of second magnetic electrical connector 312.

Electrical current thus is able to flow from first terminal 288 of first magnetic electrical connector 280 to a first magnetic terminal 320 of second magnetic electrical connector 312 and from second terminal 284 of first magnetic electrical connector 280 to a second terminal 316 of second magnetic electrical connector 312, while data, signals or a charging voltage flow from first pin conductor 292 of first magnetic electrical connector 280 to second pin conductor 296 of second magnetic electrical connector 312 and from third pin conductor 300 of first magnetic electrical connector 280 to fourth pin conductor 318 of second magnetic electrical connector.

Figure 10:
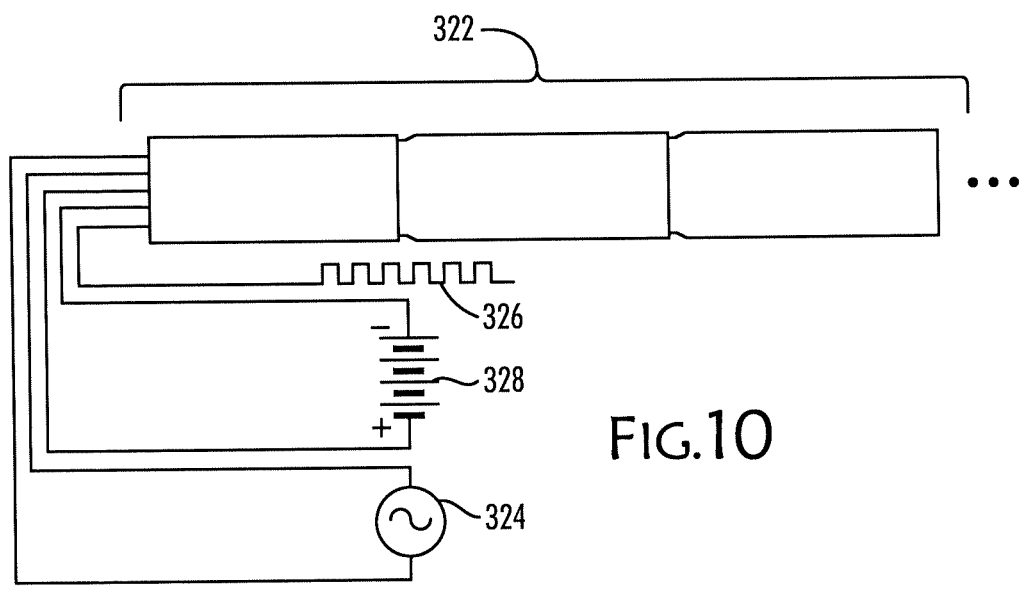
FIG. 10 is a schematic diagram of a series of interconnected conduits that transmit an alternating electrical current, direct current, and digital data, according to an aspect of the disclosure.

FIG. 10 illustrates a conduit system 322, of at least three conduits connected in a row and carrying an alternating current 324, a digital signal 326, and a charging (direct current) voltage.

Figure 11A:
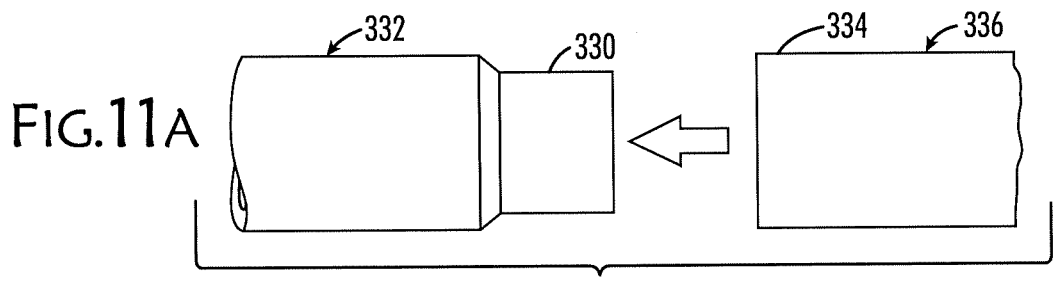
FIGS. 11A, 11B, 11C, and 11D show four variations of ways to connect conduits, including a friction fitting coupling in FIG. 11A, a threaded coupling in FIG. 11B, a threaded coupler in FIG. 11C, and a bayonet coupler in FIG. 11D, according to several aspects of the disclosure.

FIGS. 11A, 11 B, 11C, and 11D illustrate four different ways to connect conduit. IN FIG. 11A, a friction fitting between conduit 332 and conduit 336 is achieved by having a first end 330 of conduit 332 fit inside a second end 334 of conduit 336.

Figure 11B:
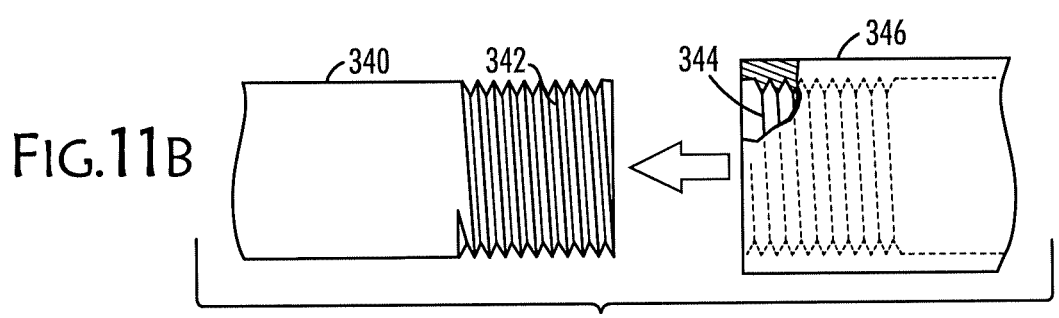

FIG. 11B shows a threaded fitting between conduit 340 and conduit 346. Threads 342 on the exterior surface of conduit 340 thread to threads 344 on the inside of conduit 346.

Figure 11C:
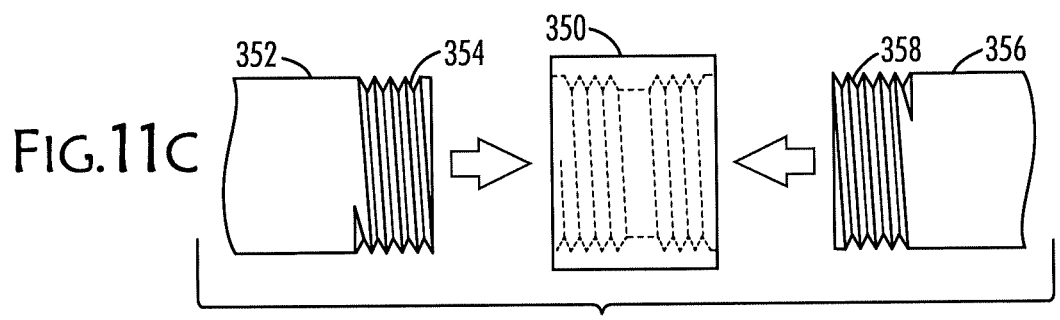

FIG. 11C also show a coupling 350 with interior threads for connecting a first coupler 352 with external threads and a second coupler 356 with external threads.

Figure 11D:
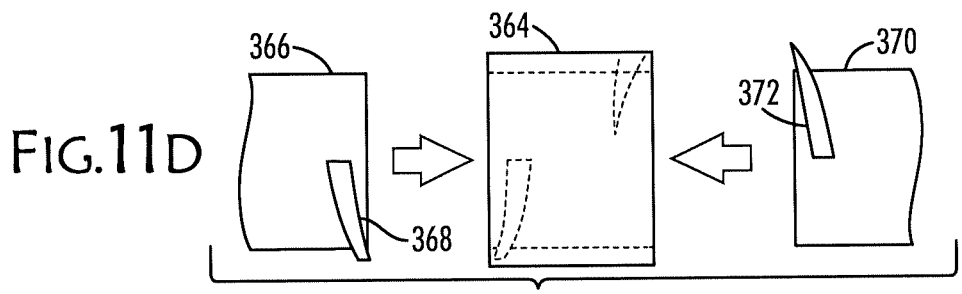

FIG. 11D shows a coupler 364 with internal bayonet grooves formed to receive an external bayonet flange 368 on a first conduit 366 and an external bayonet flange 372 on a second coupler 370.

Figure 12:
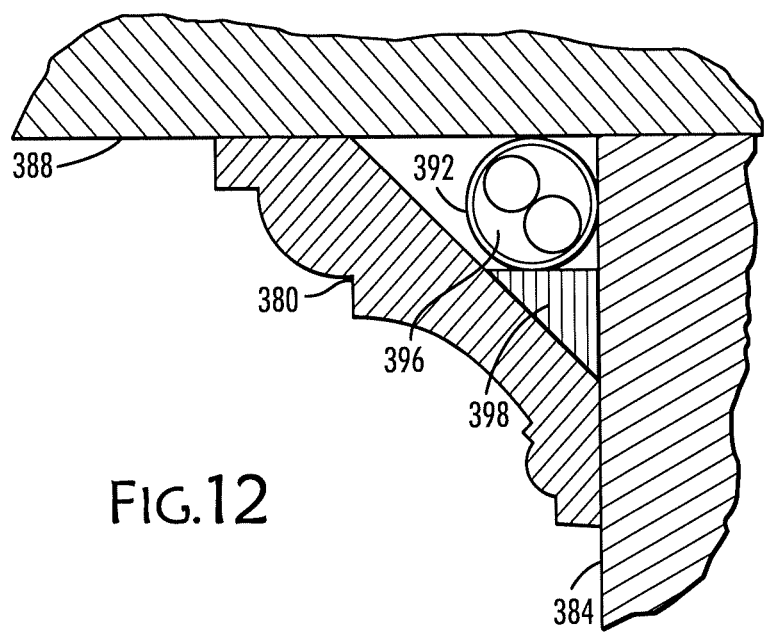
FIG. 12 illustrates a cross-section of decorative crown molding with a conduit shown in cross-section running inside the crown molding, according to an aspect of the disclosure.

FIG. 12 illustrates an example of a use of the present magnetic electrical connector, namely, a conduit 392, with a magnetic electrical connector 396 wherein conduit 392 is inside of or behind decorative trim such as crown molding 380 between a wall 384 and a ceiling 388 and which conduit 392 may be kept in place by a ledge 398 or other similar fill piece. Electrical current, digital signals, and a charging voltage may be distributed in a building, whether temporarily or permanently.

Figure 13:
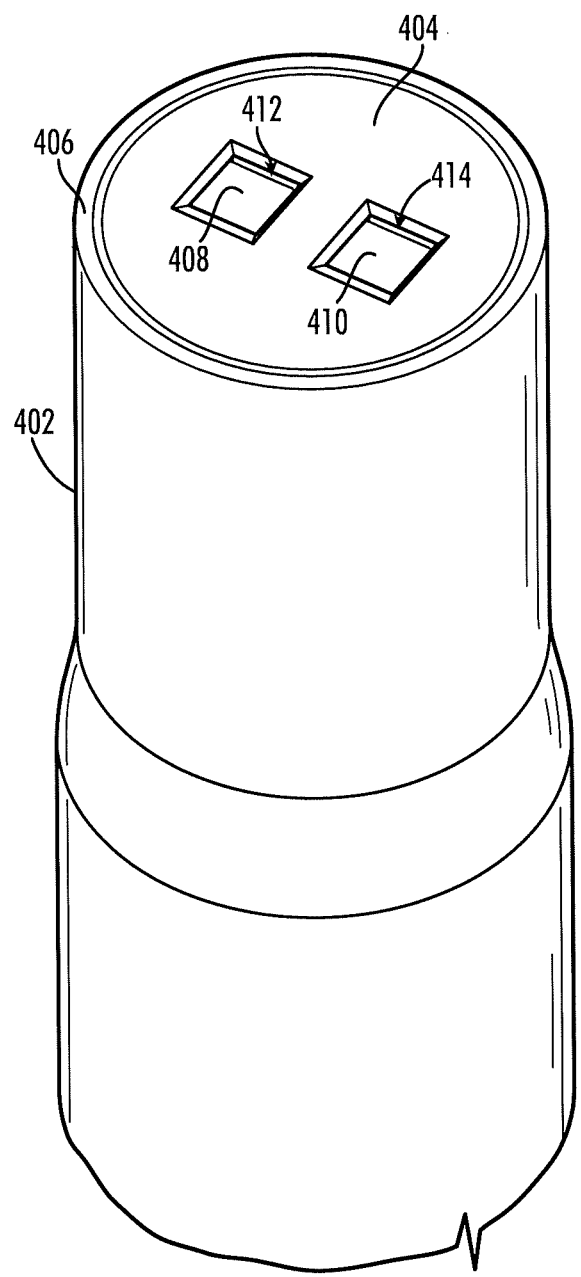
FIG. 13 is a perspective, first end view of a conduit with an alternative magnetic electrical connector flush-mounted in the reduced-diameter end of a conduit and its two electrical contacts, according to an aspect of the disclosure.
Figure 14:
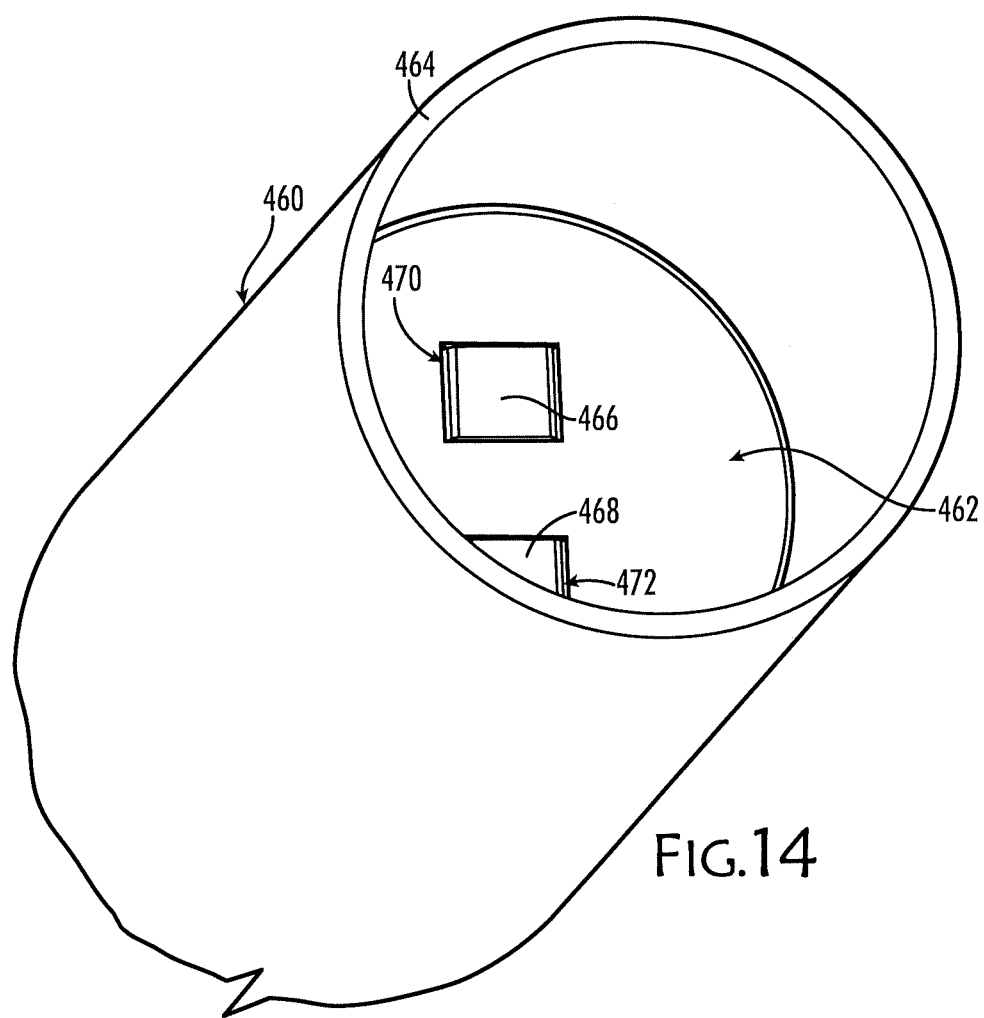
FIG. 14 is a perspective, second end view of the conduit of FIG. 13, with the alternative magnetic electrical connector recessed into the end of the conduit with its two electrical contacts, according to an aspect of the disclosure.

As illustrated in FIG. 13, there is a cross-sectional, perspective view of first conduit 402 with a first magnetic electrical connector 404 fitted flush with the end 406 of first conduit 402. FIG. 14 illustrates a second conduit 460 with a second recessed magnetic electrical connector 462 recessed from an end 464 of second conduit 460. First magnetic electrical connector 404 is shown rotated so that a first terminal 408 of first magnetic electrical connector 404 is slightly away from the viewer and second terminal 410 is toward the viewer. First terminal 408 appears through a first aperture 412 in FIG. 13; second terminal 410 appears through a second aperture 414. Likewise, in FIG. 14, a third terminal 466 appears through a third aperture 470 and fourth terminal 468 appears through a fourth aperture 472 appears through a second aperture 414.

First magnetic electrical connector has a first magnet 416 and a second magnet 418. Second magnetic electrical connector has a third magnet 474 and a fourth magnet 476

Figure 15:
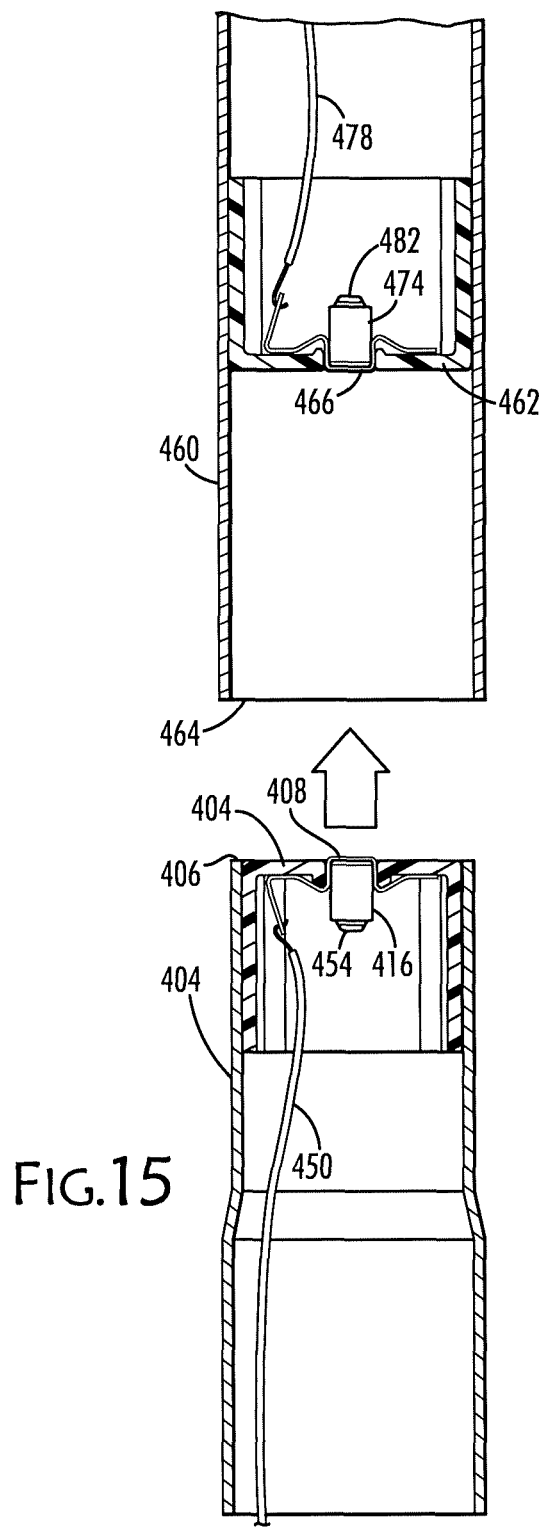
FIG. 15 is a side, cross-sectional view of two magnetic electrical connectors, each one in its conduit, with the upper magnetic electrical connector being recessed and the lower magnetic electrical connector being flush-mounted, and the two conduits indicated by an arrow to be moving together, according to an aspect of the disclosure.

By inverting first conduit 402 over second conduit 460, as shown in FIG. 15, and rotating first conduit 402 with respect to second conduit 460, first terminals 408 and third terminal 466 face each other and, not visible in FIG. 15, second terminal 410 and fourth terminal 468 face each other.

When first conduit 402 is inserted into second conduit 460 and rotated to the point where first magnetic electrical connector 404 and second magnetic electrical connector 462 are in contact, there can be two outcomes. Either they conduct electricity or they cannot, depending on whether first magnet 416 is oriented toward third magnet 474 (and of course second magnet 418 is oriented toward fourth magnet 476) so that first magnet 416 and third magnet 474 attract. If they attract, then first terminal 408 and third terminal 466 will be pushed together (as will second terminal 410 terminal and fourth terminal 468), and thus first terminal 408 and third terminal 466 are able to pass electricity and second terminal 410 and fourth terminal 468. If, for example, first magnet 416 is oriented to face fourth magnet 476, then second magnet 418 will repel fourth magnet 476 and second magnet 418 will repel third magnet 474, so second terminal 410 will not contact third terminal 466 so no electricity can pass.

Figure 16:
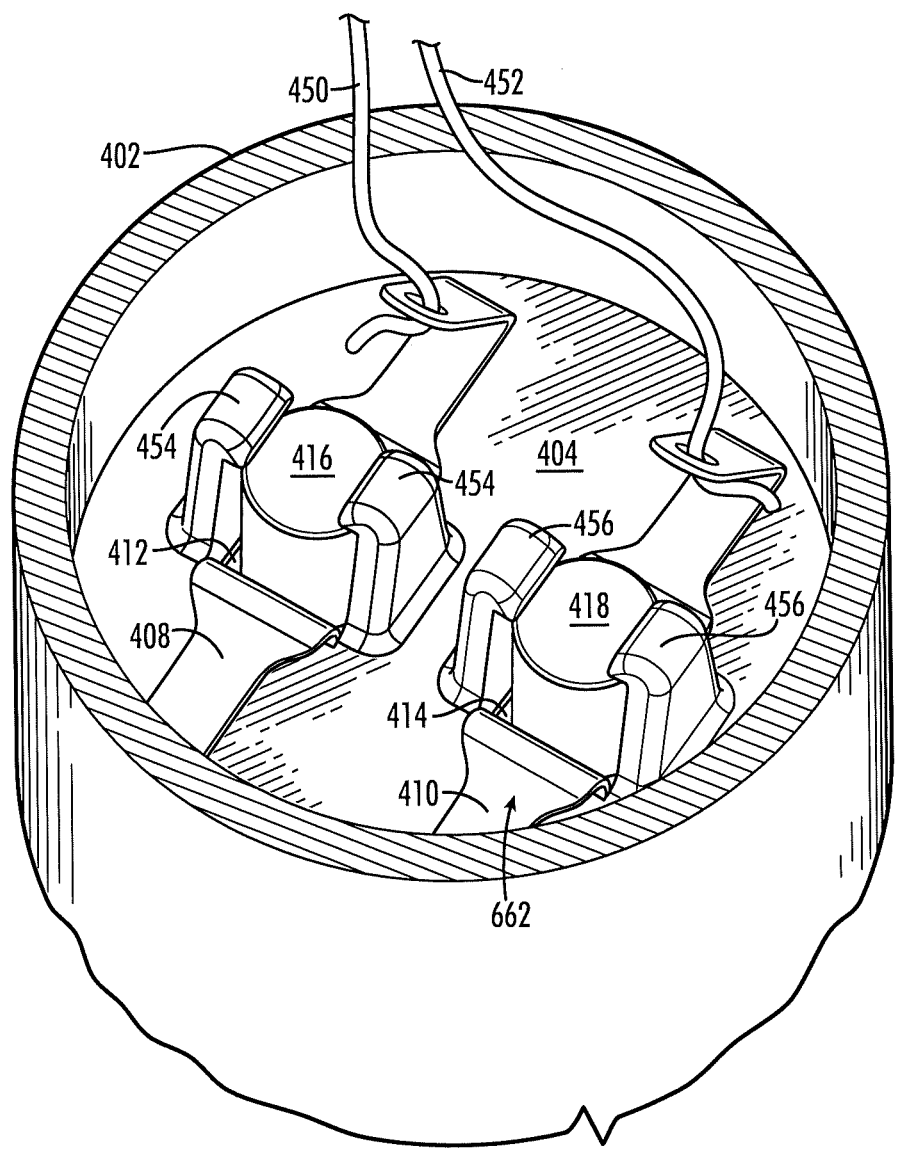
FIG. 16 is a perspective, inside view of the two electrical terminals of a magnetic electrical connector showing the magnets, the magnet keepers, and the conductive terminals, according to an aspect of the disclosure.

FIG. 16 shows the inside of first conduit 402 and first magnetic electrical connector 404 with its first terminal 408 an second terminal 410, each attached to an electrical conductor, namely first conductor 450 and second conductor 452, respectively. First terminal 408 is connected to first conductor 450; second terminal 410 is connected to second conductor 452. First magnet 416 has a first pair of keepers 454 to hold first magnet 416 in position on first terminal 408; second magnet 418 has a second pair of keepers 456 to hold second magnet 418 in position on second terminal 410.

The inside of second magnetic electrical connector 462 is identical to that of first magnetic electrical connector 404 as shown in FIG. 16.

Figure 17:
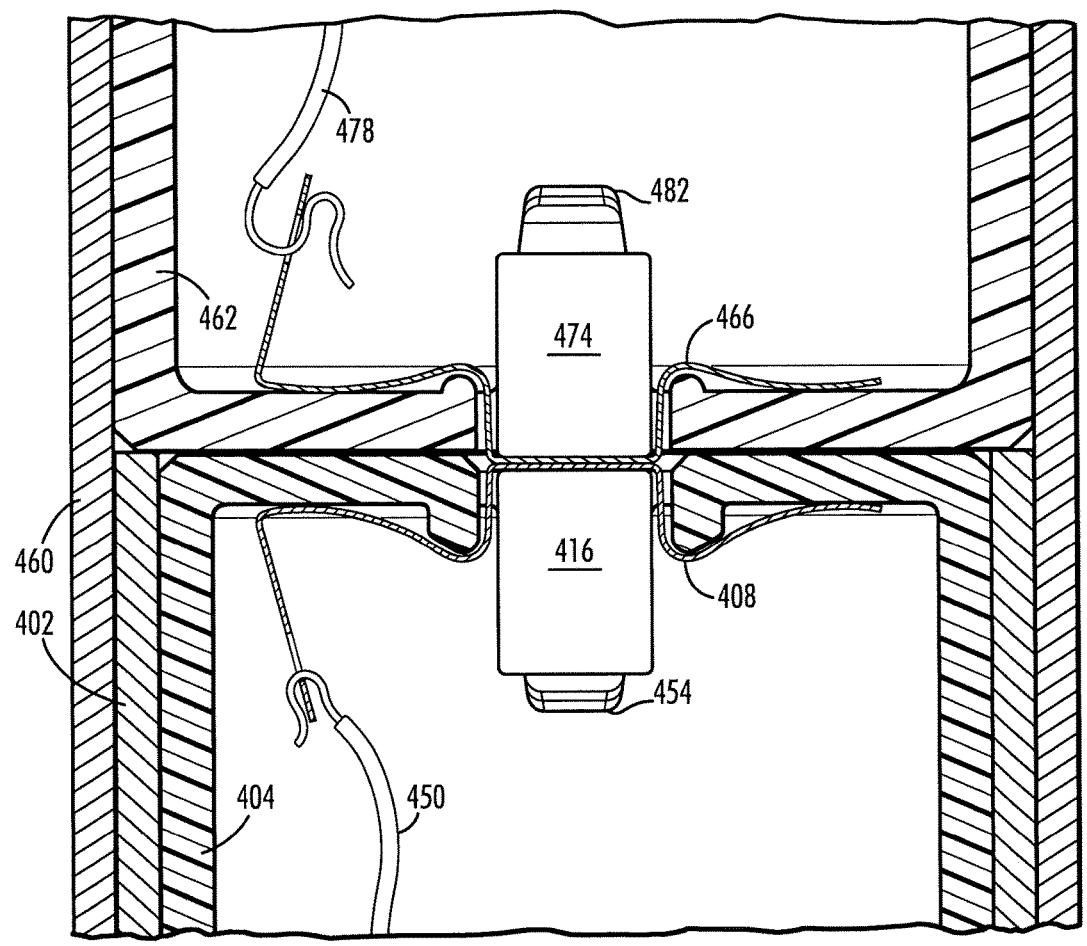
FIG. 17 is a partial side view, in cross-section, of two joined conduits with their respective magnetic electrical connectors in electrical contact with each other, the magnetic electrical connectors being properly oriented, according to an aspect of a disclosure.

FIG. 17 is a partial cross-sectional view of first conduit 402 receiving the reduced portion of second conduit 460 in an electrically conducting arrangement so that first magnetic electrical connector 404 and second magnetic electrical connector 462 face each other. First magnet 416 and third magnet 474 attract so first terminal 408 and third terminal 466 are pressed together between first magnet 416 and third magnet 474 so that they are able to conduct electricity from one to the other.

In FIG. 17 are second magnet 418, fourth magnet 476, second terminal 410, fourth terminal 468 are not visible because they are behind first magnet 416, third magnet 474, first terminal 408, third terminal 466, respectively. Second magnet 418 and fourth magnet 476 also help to press second terminal 410 against fourth terminal 468 together when the magnets of the magnetic electrical connectors attract.

Figure 18:
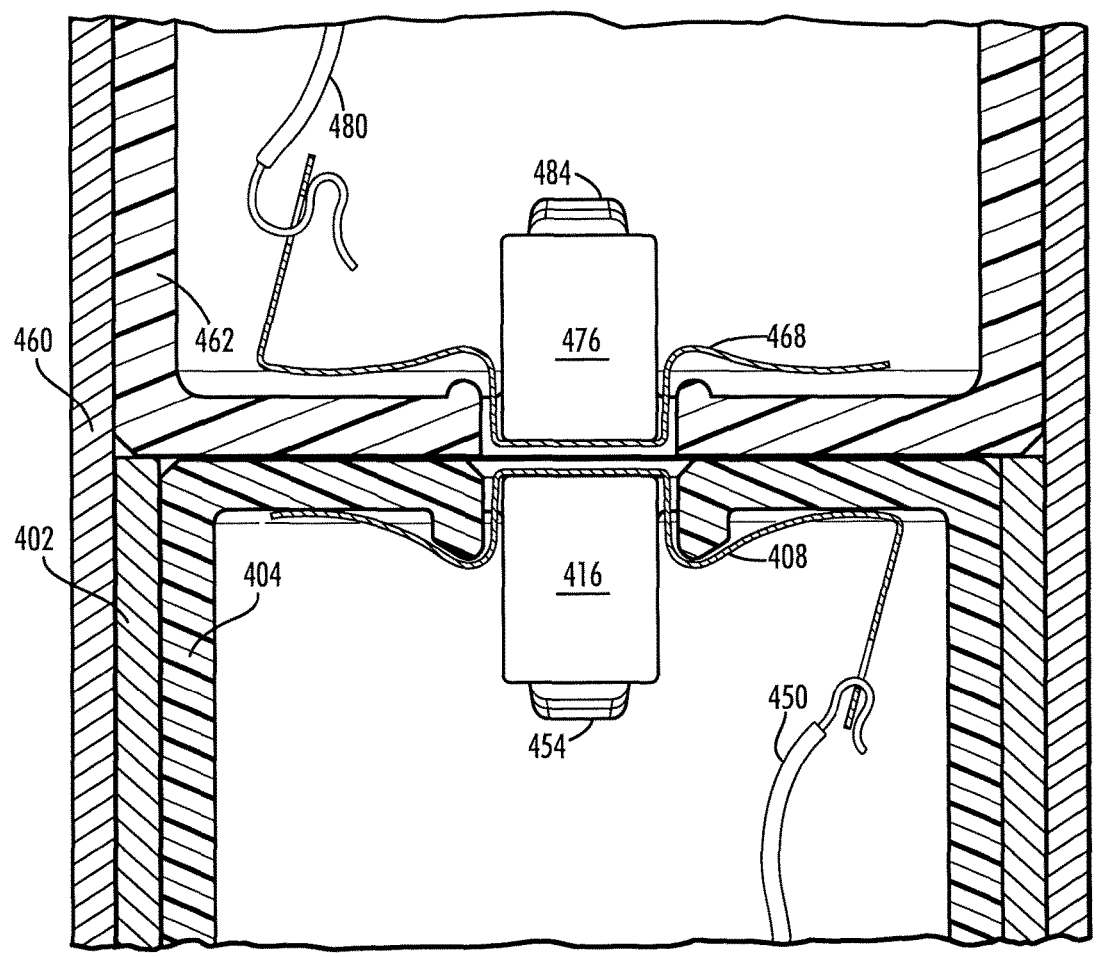
FIG. 18 is the same partial side, cross-sectional view of two conduits as shown in FIG. 17, and with the magnetic electrical connectors not being in electrical contact as the magnetic electrical connectors are not properly oriented, according to an aspect of the disclosure.

FIG. 18 shows second conduit 460 rotated 180 degrees so that second magnetic electrical connector 462 is also rotated 180 degrees. Now, no electricity passes because first magnet 416 is facing fourth magnet 476, which repel the other. Accordingly, first terminal 405 does not touch fourth terminal 468.

Limiting movement of first magnet 416 and second magnet 418 is a first set of keepers 454 and a second set of keepers 456, respectively, which prevent first magnet and second magnet from moving to far away from first terminal 408 and second terminal 410, respectively. Similarly, third magnet 474 and fourth magnet 476 also have keepers, a third pair of keepers 482 and a fourth pair of keepers 484.

Figure 19A:
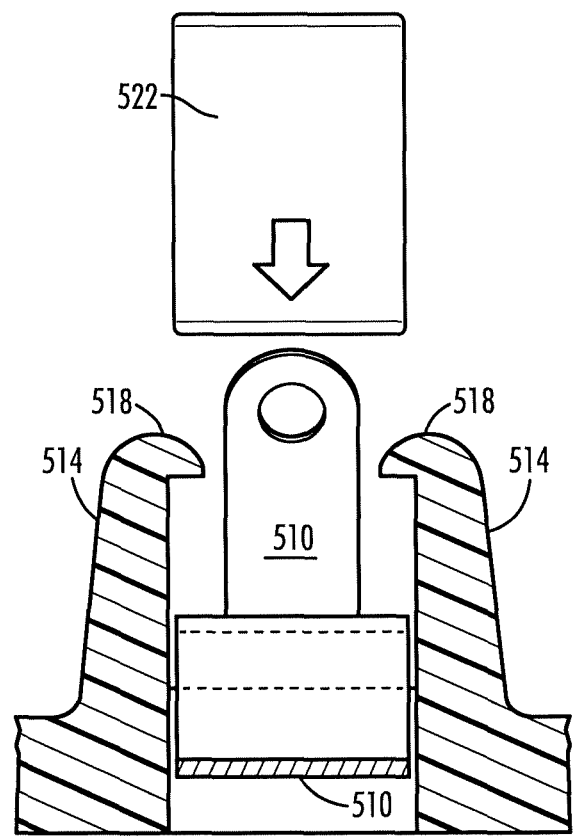
FIGS. 19A, 19B, and 19C comprise a sequence of cross-sectional side views of a magnet moving between two keepers of a magnetic electrical connector, according to an aspect of the disclosure, wherein, in FIG. 19A, the magnet is above its terminal and the keepers, and, in FIG. 19B, the magnet is passing between the two keepers, and, in FIG. 19C, the magnet rests on the terminal with the keepers closed above it to their initial positions, in FIG. 19C.
Figure 19B:
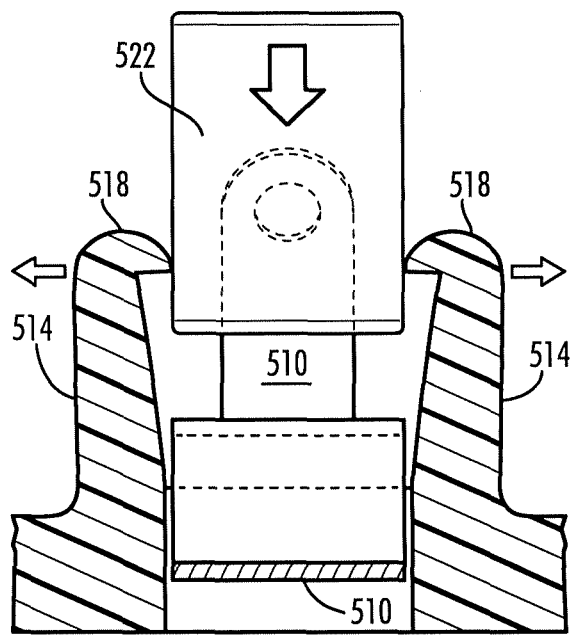
Figure 19C:
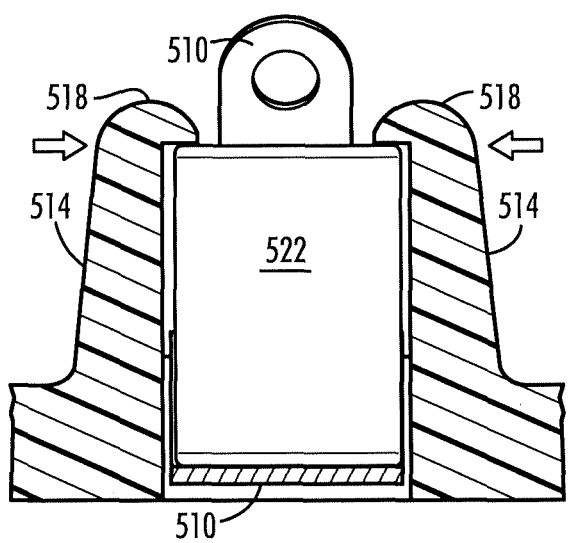

FIG. 19A shows a terminal 510, two keepers 514 each with a curved portion 518, and a magnet 522. Keepers 514 are made of a flexible, resilient material such as a plastic. FIG. 19B shows keepers 514 with terminal 510 and with a magnet 522 partially inserted between keepers 514. FIG. 19C shows keepers 514 with terminal 510 and magnet 522 seated on terminal 696 and in place between keepers 514. Curved portion 518 on keepers 514, on the insertion of magnet 698, close over magnet 522 to prevent its removal.

Accordingly, magnets by their orientation and by the magnetic attraction and repulsion forces operate as switches to open or close circuits depending on the orientation of first and second magnetic electrical connectors by pushing terminals together or leaving them apart. They can therefore preserve polarity of direct current sources to the direct current loads.

Conduits, such as conduits shown herein may also carry internal controllers, power modifiers, and safety monitors, such as ground fault interrupters. These additional electrical devices may be installed in conduits described herein to meet general requirements based on safety regulations or specific needs. Accordingly, whenever there are new safety regulations, conforming to those requirements may be much easier with the present electricity access system.

Conduits may be made out of most any material that will work within the specified application and regulatory requirements. Conduits may be cylindrical and they otherwise are made to meet or exceed to applicable standards.

The present magnetic repulsion/attraction-based electrical access system connects automatically once workers bring the magnetic electrical connectors into proximity. It may reduce the cost of installing electrical, multiline phone systems, burglary systems, cable systems, paging systems, zonal sounds systems, cable antenna driver systems, local repeaters, intercom systems, instrument control systems, zonal air conditioning controllers and thermostats.

Because of their universal nature, general purpose conduits may be made in standard lengths (such as 6", 12", 18", 24", 30", 36", 48", 5', 10' sections) with short, dedicated inline taps for accessing AC power USB ports, networking connections, monitors, televisions, radios; night lights, counter lighting, under counter lighting, dedicated pole lights, etc.

Those skilled in the art of the installation and deployment of electrical devices and appliances in buildings, shelters, and homes will appreciate that many modifications and substitutions may be made in the foregoing description of aspects of the disclosure.

What is claimed is:

1. An electrical power distribution system, comprising:
a first conduit having a first end and a second end;
a second conduit having a third end and a fourth end, the second end of the first conduit being connected to the third end of the second conduit;
a first magnetic electrical connector in the second end of the first conduit, wherein the first magnetic electrical connector has
a first terminal,
a second terminal,
a first magnet, and
a second magnet;
a second magnetic electrical connector in the third end of the second conduit, wherein the second magnetic electrical connector has
a third terminal,
a fourth terminal,
a third magnet, and
a fourth magnet;
a source of electrical current connected across the first terminal and the second terminal of the first magnetic electrical connector; and
an electrical load connected across the third terminal and the fourth terminal of the second magnetic electrical connector; wherein the first terminal and the third terminal are pressed together by magnetic attraction between the first magnet and the third magnet, and the second terminal and the fourth terminal are pressed together by magnetic attraction between the second magnet and the fourth magnet, wherein an electrical current passes from the source of electrical current through the first conduit and the second conduit to said electrical load,
wherein the second end of the first conduit include a first aperture and a second aperture, and the third end of the second conduit includes a third aperture and a fourth aperture formed therein, wherein the first aperture faces the third aperture and the second aperture faces the fourth aperture, and wherein the first terminal is positioned at the first aperture, the second terminal is positioned at the second aperture, the third terminal is positioned at the third aperture, and the fourth terminal is positioned at the fourth aperture wherein the first terminal touches the third terminal when the first magnet presses the first terminal toward the third terminal and the third magnet presses the third terminal toward the first terminal, and the second terminal touches the fourth terminal when the second magnet presses the second terminal toward the fourth terminal and the fourth magnet pressed the fourth terminal toward the second terminal.

2. The electrical power distribution system of claim 1, wherein the first magnet is held near the first aperture by a first set of keepers, the second magnet is held near the second aperture by a second set of keepers; the third magnet is held near the third aperture by a third set of keepers; and the fourth magnet is held near the fourth aperture by a fourth set of keepers.

3. The electrical power distribution system of claim 1, wherein the first conduit and the second conduit are traffic barriers.

4. The electrical power distribution system of claim 1, wherein the first conduit and the second conduit are scaffolding.

5. The electrical power distribution system of claim 1, wherein the first conduit and the second conduit are velvet rope barriers.

6. The electrical power distribution system of claim 1, wherein the first conduit and the second conduit are decorative trim.

7. The electrical power distribution system of claim 1, wherein the first conduit and the second conduit are friction fitted together.

8. The electrical power distribution system of claim 1, wherein the first conduit and the second conduit are threadably joined together.

9. The electrical power distribution system of claim 1, wherein the first conduit and the second conduit are joined together by a coupler.

10. The electrical power distribution system of claim 1, wherein the first conduit and the second conduit are joined with bayonet fittings.

11. The electrical power distribution system of claim 1, wherein the first magnetic electrical connector further comprises a first pin conductor and a second pin conductor, and the second magnetic electrical connector further comprises a third pin conductor and a fourth pin conductor, said first pin conductor being in electrical contact with said third pin conductor, and said second pin conductor being in electrical connection with said fourth pin conductor.

12. The electrical power distribution system of claim 11, wherein said first pin conductor and said second pin conductor conduct direct current.

13. The electrical power distribution system of claim 11, wherein said first pin conductor and said second pin conductor conduct digital data.

14. The electrical power distribution system of claim 11, wherein said first pin conductor and said second pin conductor conduct alternating current.

* * * * *